United States Patent Office 3,337,022
Patented Aug. 22, 1967

3,337,022
PORTABLE POWERED CONVEYOR
Stanley H. Merry, West St., Duxbury, Mass. 02332
Filed Sept. 29, 1965, Ser. No. 491,351
9 Claims. (Cl. 198—75)

The present invention relates to conveyors and more particularly to portable powered conveyors of the belt type wherein the conveyor system comprises a plurality of conveyor sections in tandem.

In the past when large quantities of stored items have to be moved in a short period of time, a difficult problem has been the provision of suitable mechanical handling equipment that can be set up easily and quickly for the short period of use and then quickly disassembled and stored in such a manner that it will not interfere with the normal use of the area involved.

The problem has been particularly acute aboard ships, such as naval supply ships, that must quickly discharge cargo and then disassemble the discharging systems to make room for normal operations in the passageways. In the past, various devices, particularly conveyors, have been employed to accomplish the required material movements but were unsatisfactory for various reasons. Notable of these reasons were (1) the difficulty of assembly and disassembly, (2) the inability of operation while resting on the deck or floor, (3) discontinuities in the driving mechanism, and (4) inflexible powering arrangements.

The deficiencies of the prior art devices are remedied in the device of the present invention. The invention consists of a portable powered conveyor with a continuous belt driving surface, provisions for easy assembly and disassembly, capability for operation flat with a floor or deck and driving arrangements adaptable for use with varying power sources.

It is therefore an object of the present invention to provide a portable powered conveyor.

A further object of the invention is the provision of a portable powered conveyor adaptable for shipboard use.

Another object is the provision of a portable powered conveyor operable when flat with a floor or deck.

Still another object of the present invention is a portable powered conveyor which can be easily and swiftly assembled and disassembled.

A further object is the provision of a portable powered conveyor with a continuous powered driving surface.

A final object is the provision of a portable powered conveyor with driving means adapted for use with varying power sources.

Figure 1:
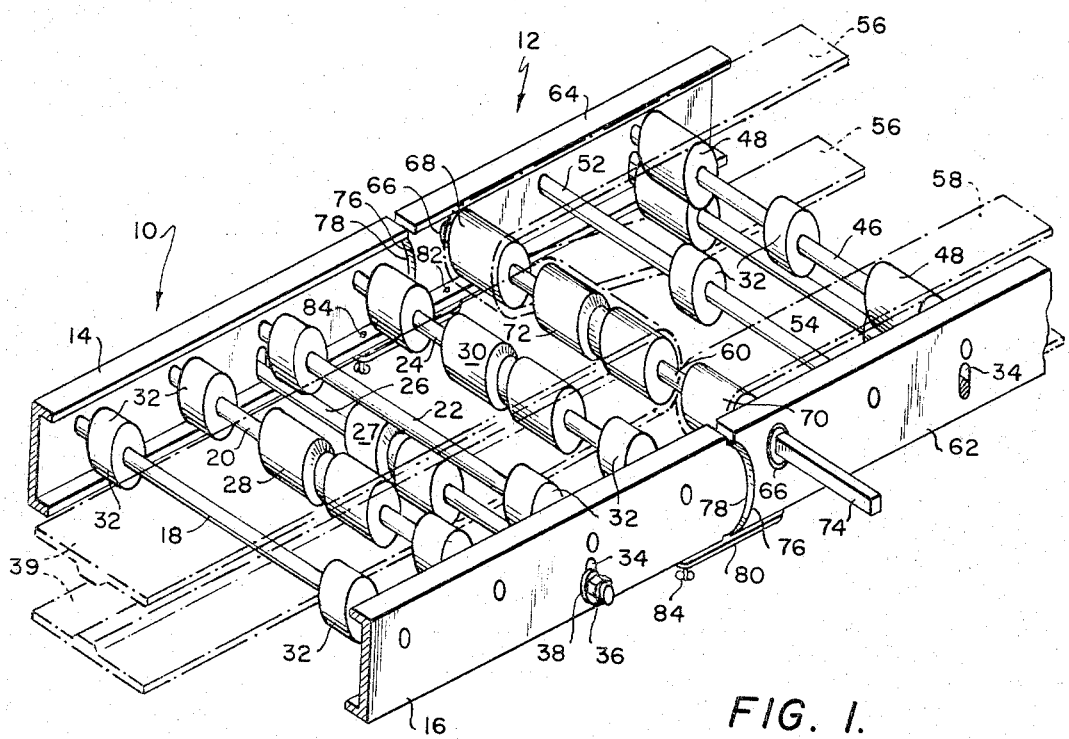
Figure 2:
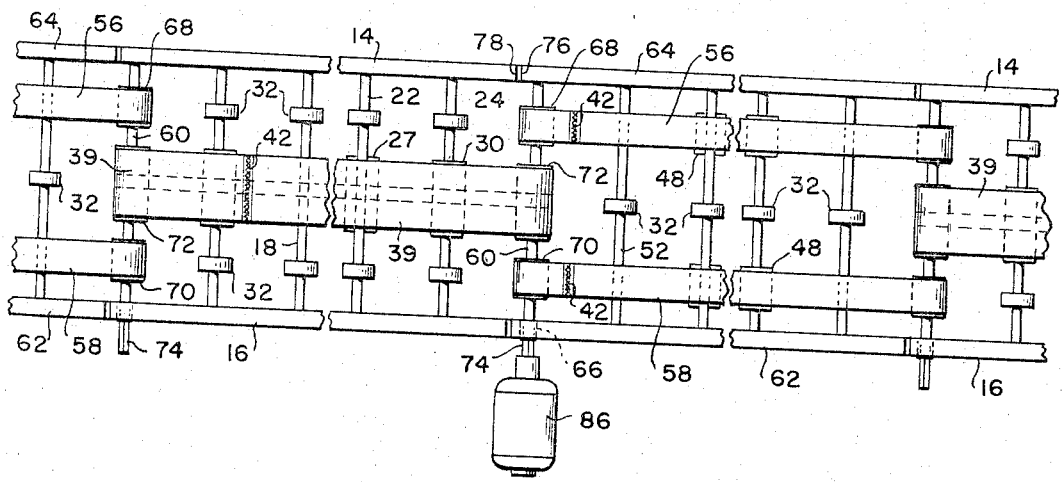

Other objects and many of the attendant advantages of this invention will be readily appreciated as the same becomes better understood by reference to the following detailed description of a preferred embodiment thereof when considered in connection with the accompanying drawing wherein:

FIG. 1 is a perspective view of the unique joint structure of a preferred embodiment of the invention; and FIG. 2 is a plan view of the preferred embodiment of the invention shown in FIG. 1 illustrating several conveyor sections in tandem.

Referring now to the drawings, in FIG. 1 is shown the unique joint structure that makes possible many of the advantages of the invention. Indicated generally at reference numerals 10 and 12 are the opposite ends of the single-belt and double-belt sections, respectively, of the instant conveyor. Section 10 is shown as including stringers 14 and 16 on which are supported belt-roller idler shafts 20 and 24, roller shafts 18 and 22, and belt tension idler shaft 26. Journalled on alternate shafts along the entire length of section 10 are belt idler pulleys, the first two of which are designated by reference numerals 28 and 30. These belt pulleys as well as the belt pulleys throughout both sections 10 and 12 may be of the V-type as shown in section 10, may be flanged to contain the belts between pulley flanges, or may be flat as shown in section 12. Each belt roller idler shaft also carries two rollers 32. Between the shafts carrying the belt pulleys are located the roller shafts, the first two of which are shown at 18 and 22 carrying two rollers 32 on each shaft.

Below the level of the upper row of shafts is located the belt tension idler shaft 26 which is adjustable vertically in slots 34. Journalled on shaft 26 is belt tension idler pulley 27. Shaft 26 can be maintained in selected vertical positions by tightening nuts 36 against washers 38.

The idler pulleys and rollers are mounted for free rotation and this may be accomplished by bearings in the rollers and idler pulleys or by rotatable shafts. However, in the preferred embodiment of the invention, individual bearings for each of the idler pulleys and rollers are preferred because they allow independent rotation of each idler pulley and roller.

For purposes of clarity, the single broad belt 39 is shown in phantom in FIG. 1. It can be of any standard construction but, in the embodiment shown, it has a wedge-shaped depending portion to cooperate with grooves 40 in the idler and belt-tension pulleys. If flanged or smooth pulleys were to be used, a flat configuration for the belt would be appropriate. The exposed or article carrying surface of the belt may be smooth or rippled to increase its friction with the articles it moves along the conveyor surface. Significant for the purposes of this invention is the provision of wire laced belt ends 42 (shown in FIG. 2) which make possible easy connection and disconnection of the belt ends.

Section 12 of the conveyor shows the same basic construction as in section 10 except that two belts are employed and the power driving means are journalled at the end thereof. Referring first to the idler shaft 46, it can be seen that it has journalled thereon two belt idlers 48 and one roller 32. The roller shaft 52, likewise, has one roller 32 journalled thereon. The belt tension shaft 54 is mounted substantially identically to that of section 10 and carries two idler pulleys 48. The belts 56 and 58 are smaller than belt 39 and are flat rather than having a wedge shaped depending portion.

A drive shaft 60 is rotatably journalled through the stringers 62 and 64 in bearings 66. It has fixedly attached thereto idler pulleys 68 and 70 for the smaller belts 56 and 58, respectively, and idler pulley 72 for the single broad belt 39. The drive shaft has a square passageway therein that extends coaxially throughout its length and this square passageway slidably receives a drive member 74. Drive member 74 is of such a length that it may be completely contained within drive shaft 60 or may be moved axially of drive shaft 60 to protrude beyond stringer 62 on the near side of the figure or to protrude beyond stringer 64 on the far side of the figure.

It should be noted that although the drive shaft has been shown in FIG. 1 as being mounted on the conveyor section 12 that carries two belts, this mounting would be duplicated at the other end of the single belt section 10, so that each section carries a drive shaft and pulleys at one end thereof.

The sections 10 and 12 are provided with mating end portions 76 and 78, respectively. End portions 76 are concave in configuration whereas portions 78 are convex. This construction allows for misalignment of the sections while still maintaining good contact between the mating portions. Bars 80 connect or secure the two sections to each other. The bars 80 at one end thereof are pivotally attached to section 12 by rivets 82 and at the opposite end thereof are attached to section 10 by thumbscrews 34, the thumbscrews of course being received in threaded passages (not shown) in section 10.

In FIG. 2, the conveyor of the present invention is shown with several complete sections connected into an operating unit. Also shown is a motor 86 which drives the belts of the several sections through the drive member 74. This motor may be permanently mounted at a location where the conveyor receives frequent use, it may be fitted with a stand corresponding in height with the conveyor, or it may consist of a portable power drill. It has been found that a one-half horsepower drill motor normally will provide enough power for 4 or 5 sections. If additional power is required, the conveyor may be driven from either side at additional points through the drive members at each joint. The motors used can be reversible so that the material may be moved in either direction and may be multi-speed to provide various delivery rates.

Prior to use, the conveyor may be stored by suspending the various sections from the ceiling of the passageway or the sections may be affixed to hinges to allow them to fold against the wall. When use of the system is required, the sections are taken down from their storage places and laid end to end on the floor or supported on suitable stands. The sections are then locked together by the use of the bars 80. Next the belts are looped over the drive pulleys and their ends connected by means of the wire lacings. Then the drive members 74 are moved so as to protrude from the drive shafts 60 and connected to the motors to be used for power. Finally, the belt tension shafts are adjusted for adequate tension to prevent slippage around the drive members. The conveyor system is then ready for operation.

Disassembly involves substantially the reverse of the above and is similarly accomplished easily and quickly.

In summary, what has been provided is a simple, easy to assemble and disassemble conveyor system that can readily be used where frequent disassembly and storage is required and that can easily be operated or stored in a minimum of space. The system further has the attributes of a continuous powered belt surface, may be powered with a variety of available power sources, and may be operated flat on the floor or supported on stands.

Obviously many modifications and variations of the present invention are possible in the light of the above teachings. It is therefore to be understood that within the scope of the appended claims, the invention may be practiced otherwise than as specifically described.

What is claimed is:

1. A conveyor system with at least two connected conveyor sections comprising:
    a first conveyor section including spaced parallel stringers supporting a plurality of belt roller idler shafts and a drive shaft;
    said idler shafts having belt idler pulleys mounted thereon and said drive shaft having drive pulleys mounted thereon;
    a second conveyor section including spaced parallel stringers supporting a plurality of idler shafts and a drive shaft;
    said idler shafts having idler pulleys mounted thereon and said drive shaft having belt drive pulleys mounted thereon;
    at least one connecting bar adapted to fix said first section to said second section;
    at least one belt carried by said first section idler roller pulleys and over said belt drive pulleys on said first and second sections; and
    at least one belt carried by said second section idler roller pulleys and looped over said drive pulleys on said first and second sections, said belts being trained over said drive pulleys for frictional engagement therewith.

2. The conveyor system of claim 1 which includes power means to rotate at least one of said drive shafts.

3. The conveyor system of claim 1 which includes belt tension idler shafts and pulleys supported by said stringers on said first and second conveyor sections below the line of said idler shafts and pulleys.

4. The conveyor system of claim 3 which further includes roller shafts supported by said stringers and rollers mounted on said roller shafts.

5. The conveyor system of claim 3 wherein said belt tension idler shafts are adjustable to vary the tension of said belts.

6. The conveyor system of claim 1 further including:
    mating surfaces on the ends of each of said stringers of said first and second sections;
    whereby good mechanical contact is made between said conveyor sections despite horizontal misalignment between said sections.

7. The conveyor system of claim 6 wherein said mating surfaces comprise:
    complementary concave and convex configurations on opposing ends of said first and second sections.

8. A powered conveyor system with at least two conveyor sections comprising:
    means for connecting said sections; first, second, and third movable belts;
    a first conveyor section having spaced parallel elongated stringers;
    first and second groups of shafts mounted along and between said stringers nears the upper edge thereof;
    idler pulleys mounted singly on a first group of said shafts and centrally located between said stringers, said idler pulleys being adapted to rotate and support a first movable belt thereon;
    rollers mounted on said first group of shafts and on a second group of said shafts, said rollers being adapted to support packages moving along said conveyor under the urging of said movable belt;
    a belt tension idler shaft with a belt tension idler pulley mounted thereon and adapted to rotate, said belt tension idler shaft and pulley being adjustably mounted near the lower edge of said stringers and being adapted to engage the inside surface of said belt;
    a second conveyor section having spaced parallel elongated stringers;
    first and second groups of shafts mounted along and between said stringers near the upper edge thereof;
    idler pulleys mounted two to each shaft and spaced from the center of a first group of said shafts, said idler pulleys being adapted to rotate and support second and third movable belts thereon;
    rollers mounted in the center of each of said shafts of said first group and on a second group thereof, said rollers being adapted to support material moving along said conveyor under the urging of said movable belt;
    a belt tension idler shaft with a belt tension idler pulley mounted thereon and adapted to rotate, said belt tension idler shaft and pulley being adjustably mounted near the lower edge of said stringers and being adapted to engage the inside surface of said belt; and
    a drive shaft mounted on the stringers of each of said sections and each of said shafts having fixed thereto in a central location a first belt drive pulley adapted to engage said first movable belt and having fixed thereto on each side of said first pulley second and third belt drive pulleys, said second and third belt drive pulleys on the drive shaft of said second sections, adapted to engage said second and third belts respectively.

9. A powered conveyor system comprising a plurality of first and second conveyor sections said first and second sections being operatively connected in an alternating manner; first, second and third movable belts;
    each of said second sections having adjacent each end thereof one of said first sections in an end to end relationship;

said first conveyor sections having spaced parallel elongated stringers;

first and second groups of shafts mounted along and between said stringers near the upper edge thereof;

idler pulleys mounted singly on a first group of said shafts and centrally located between said stringers, said idler pulleys being adapted to rotate and support a first movable belt thereon;

rollers mounted on said first group of shafts and on a second group of said shafts, said rollers being adapted to support packages moving along said conveyor under the urging of said movable belt;

a belt tension idler shaft with a belt tension pulley mounted thereon and adapted to rotate, said belt tension idler shaft and pulley being adjustably mounted near the lower edge of said stringed and being adapted to engage the inside surface of said belt;

said second conveyor sections having spaced parallel elongated stringers;

first and second groups of shafts mounted along and between said stringers near the upper edge thereof;

idler pulleys mounted two to each shaft and spaced from the center of a first group of said shafts, said idler pulleys being adapted to rotate and support second and third movable belts thereon;

rollers mounted in the center of each of said shafts of said first group and on a second group thereof, said rollers being adapted to support material moving along said conveyor under the urging of said movable belts;

a belt tension idler shaft with a belt tension idler pulley mounted thereon and adapted to rotate, said belt tension idler shaft and pulley being adjustably mounted near the lower edge of said stringers and being adapted to engage the inside surface of said belt; and drive shafts mounted on the stringers of each of said first and second sections at one end thereof and having fixed on each side of said first pulley second and third belt drive pulleys; said first belts being looped over said first belt drive pulleys on one of said first sections and said first belt drive pulley on the adjacent second section, said second and third belts being looped over said second and third belt drive pulleys of said second section and the second and third belt drive pulleys of another of said first sections adjacent the other end of said second section, said belts being trained over said pulleys for frictional engagement therewith;

a drive member slidably mounted in each of said drive shafts said drive member being adapted to be extended from either side of said stringers, power means operatively connected to at least one of said drive members at the portion extending from said stringers.

References Cited

UNITED STATES PATENTS

| | | | |
|---|---|---|---|
| 207,626 | 9/1878 | Sargent | 198—193 |
| 2,007,862 | 7/1935 | Hurxthal | 198—194 |
| 2,649,177 | 8/1953 | Anderson | 198—35 |
| 3,180,480 | 4/1965 | Preston | 198—127 |

FOREIGN PATENTS 214,173   4/1924   Great Britain.

ANDRES H. NIELSEN, *Primary Examiner.*

RICHARD E. AEGERTER, *Examiner.*